United States Patent [19]
Ohta et al.

[11] Patent Number: 5,669,024
[45] Date of Patent: Sep. 16, 1997

[54] CAMERA HAVING A RED-EYE REDUCTION LAMP ARRANGED WITH RESPECT TO A STROBE LIGHT GENERATING UNIT TO PROVIDE A COMPACT CAMERA

[75] Inventors: Hidefumi Ohta, Kawasaki; Kiyosada Machida, Urawa, both of Japan

[73] Assignee: Nikon Corporation, Tokyo, Japan

[21] Appl. No.: 581,991

[22] Filed: Jan. 2, 1996

[30] Foreign Application Priority Data

Feb. 24, 1995 [JP] Japan .................................... 7-036696

[51] Int. Cl.$^6$ .................................................. G03B 15/03
[52] U.S. Cl. ........................................... 396/176; 396/535
[58] Field of Search ............................. 354/149.4, 288, 354/132; 396/176, 177, 178, 535

[56] References Cited

U.S. PATENT DOCUMENTS

| | | | |
|---|---|---|---|
| 4,992,810 | 2/1991 | Schappler | 354/149.11 |
| 5,381,200 | 1/1995 | Takagai | 354/288 |

*Primary Examiner*—David M. Gray

[57] ABSTRACT

A camera including a built-in strobe light generating unit having a strobe capacitor and a red-eye reduction lamp to reduce red-eye phenomenon. The red-eye reduction lamp is positioned between the strobe light generating unit and the strobe capacitor. The strobe capacitor, red-eye reduction lamp and the strobe light generating unit are arranged in the vertical direction within the camera body. To provide a compact camera, the red-eye reduction lamp is located above the strobe capacitor in a space between a pair of terminals projecting from the strobe capacitor, and below the strobe light generating unit, in a cut-away portion of a strobe reflector.

29 Claims, 2 Drawing Sheets

CAMERA HAVING A RED-EYE REDUCTION LAMP ARRANGED WITH RESPECT TO A STROBE LIGHT GENERATING UNIT TO PROVIDE A COMPACT CAMERA

BACKGROUND OF THE INVENTION

1. Field of the Invention

The present invention relates to a camera having a built-in strobe light generating unit for performing flash photography and a red-eye reduction lamp to reduce red-eye phenomenon, and, more particularly, the present invention relates to a camera having a strobe light generating unit and red-eye reduction lamp arranged with respect to each other in the camera body to provide a compact camera.

2. Description of the Related Art

Cameras having a built-in strobe are known. In the known cameras having a built-in strobe, a strobe light generating unit for flash photography is typically positioned in the front side of the camera body, separated as far as possible from the lens barrel of the photographic lens. For example, when viewing the camera body from the front, the strobe light generating unit is generally positioned in an upper right-hand side portion of the front side of the camera body, opposite a release button arranged in a left-hand side portion of the camera body. When performing color photography with the above-described built-in strobe type camera, and taking close-up photographs of people from the front, the light from the strobe light generating unit may cause the pupil of the human eye to acquire a red rendering (hereinafter referred to as "red-eye phenomenon"). The red-eye phenomenon is marked in cases in which the optical axis of the photographic lens and the strobe light generating unit are close together. To prevent the red-eye phenomenon, it is necessary for the spacing between the photographic lens and the strobe light generating unit to be as large as possible.

However, in a small camera, such as a compact camera, it is difficult to provide spacing between the optical axis of the photographic lens and the strobe light generating unit, and, therefore, it is difficult to prevent the occurrence of the red-eye phenomenon. Because of the difficulty arranging spacing between the optical axis of the photographic lens and the strobe light generating unit, to prevent or reduce the red-eye phenomenon in the built-in strobe type camera, a separate red-eye reduction lamp is arranged peripherally of the lens barrel at the front side of the camera body. The red-eye reduction lamp is coupled to the strobe light generating unit so that the red-eye reduction lamp generates light at the time of flash photography to prevent or reduce the red-eye phenomenon during flash photography.

However, in the above-described built-in strobe type camera, it is difficult to find a place in the camera body to attach a light generating member which functions as the red-eye reduction lamp. For example, placing the red-eye reduction lamp close to the strobe light generating unit has been considered. By placing the red-eye reduction lamp close to the strobe light generating unit, to form a unit with the strobe light generating unit, ease of assembly is increased, and by using previously unused space ("dead space"), compactness of the camera body is possible. In positioning the light generating member which functions as a red-eye reduction lamp close to the strobe light generating unit, it is also necessary to consider the relationship between the light generating member and other constituent members built into the camera body. For example, it is necessary to consider the relationship between the light generating member and a strobe light generation circuit which performs control of strobe light generation, a strobe capacitor which performs charging for strobe light generation, and a battery which supplies electric power to electric system components in the camera, including the strobe capacitor.

Positioning the red-eye reduction lamp in a portion of a strobe reflector, located at the lower side of the strobe light generating unit, has been considered to provide efficient use of space and ease of assembly. Further, positioning of the strobe capacitor at the lower side of the strobe light generating unit has been considered from the aspect of camera body height.

When the above-noted points are taken into account, the red-eye reduction lamp may be positioned adjacent to the strobe capacitor at the lower side of the strobe reflector of the strobe light generating unit. However, when the red-eye reduction lamp is positioned adjacent to the strobe capacitor at the lower side of the strobe reflector, the height of the strobe light generating unit, the height of the red-eye reduction lamp unit, the height of the strobe capacitor and the length of terminals for external connection which project from an end portion of the strobe capacitor all contribute to the total overall height of the camera.

In particular, since the above-described structure simply stacks up the camera components and the mutual spacing between components is not compressed, it is difficult to make the camera compact. Accordingly, what is needed is a camera having an arrangement of components of the strobe light generating unit and red-eye reduction lamp to provide a more compact structure.

SUMMARY OF THE INVENTION

It is an object of the present invention to provide a camera having a built-in strobe light generating unit and a red-eye reduction light generating unit.

It is another object of the present invention to provide an improved structure of a camera having a strobe light generating unit and a red-eye reduction light generating unit by positioning the red-eye reduction light generating unit adjacent to and between a strobe capacitor and a strobe light generating unit in the camera body to provide compactness of the camera.

Additional objects and advantages of the invention will be set forth in part in the description which follows, and, in part, will be obvious from the description, or may be learned by practice of the invention.

Objects and advantages of the present invention are obtained with a camera including a built-in strobe light generating unit (electronic flash device) and a red-eye reduction light generating unit. The strobe capacitor is positioned below the strobe light generating unit in the camera body. The red-eye reduction light generating unit is positioned adjacent to the strobe capacitor and at least one portion of the red-eye reduction light generating unit is positioned to face a space between a pair of terminals which project from the strobe capacitor. Further, the strobe light generating unit includes a strobe reflector and a portion of the red-eye reduction light generating unit is positioned so as to border on a cut away portion arranged in a lower side of the strobe reflector.

In accordance with embodiments of the present invention, by positioning at least a portion of the red-eye reduction light generating unit facing a strobe capacitor and between the terminals of the strobe capacitor, the space between the terminals can be effectively used.

Further, in accordance with embodiments of the present invention, by positioning the red-eye reduction light generating unit between the strobe light generating unit and the strobe capacitor, to border on a cut away portion of the strobe reflector or a space between terminals of the strobe capacitor, the space between the terminals, and the space due to the cut away portion, can be effectively used.

BRIEF DESCRIPTION OF THE DRAWINGS

These and other objects and advantages of the invention will become apparent and more readily appreciated from the following description of the preferred embodiments, taken in conjunction with the accompanying drawings, of which.

DETAILED DESCRIPTION OF THE PREFERRED EMBODIMENTS

Figure 1:
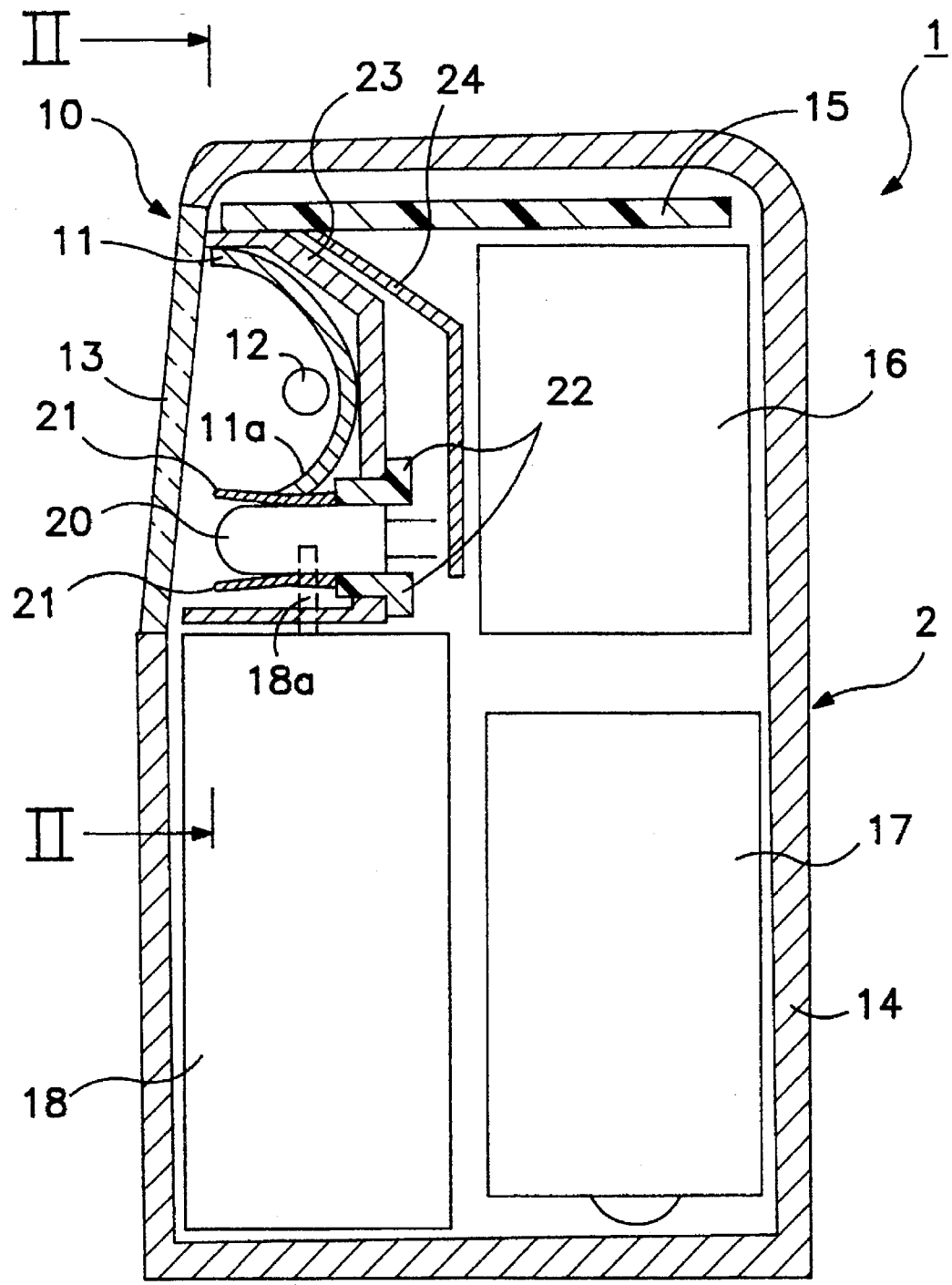
FIG. 1 is a vertical sectional diagram of a camera body having a strobe light generating unit and red-eye reduction light generating unit arranged in accordance with embodiments of the present invention.

Reference will now be made in detail to the preferred embodiments of the present invention, examples of which are illustrated in the accompanying drawings wherein like reference numerals refer to the same or similar elements throughout.

Figure 2:
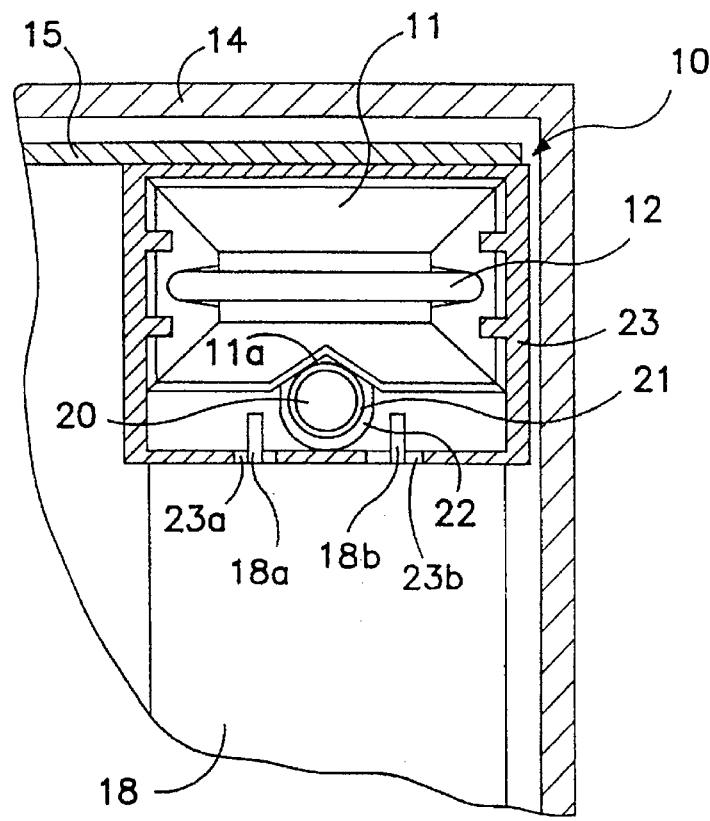
FIG. 2 is a cross section of the camera shown in FIG. 1 taken along the line II—II in accordance with embodiments of the present invention.
Figure 3:
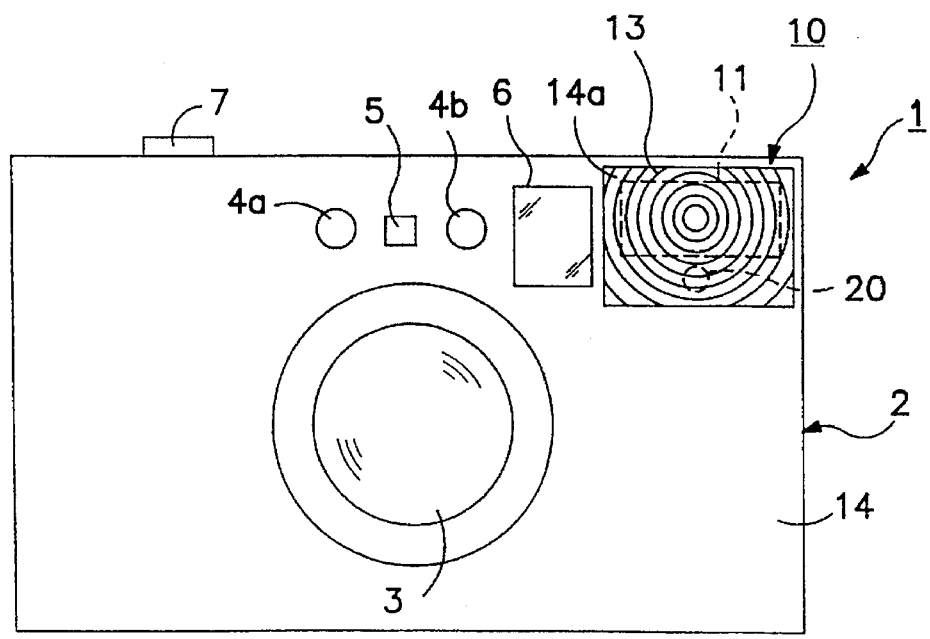
FIG. 3 is a schematic front view of a camera including a built-in strobe and red-eye reduction light generating unit in accordance with embodiments of the present invention.

FIGS. 1–3 show an example of a camera 1 having a built-in strobe light generating unit and a red-eye reduction light generating unit arranged to effectively utilize camera space in accordance with embodiments of the present invention. The camera 1 shown in FIGS. 1–3 is a lens shutter type of compact camera (which is a built-in strobe type camera) having a strobe light generating unit incorporated in the camera body. However, the present invention is not limited to a lens shutter type of camera, and is also applicable to other types of cameras having a built-in strobe.

As shown in FIGS. 1 and 3, the camera 1 includes a thin-walled approximately box-shaped camera body 2. As shown in FIG. 3, a photographic lens 3 is arranged in a lens barrel at the center of the front surface of the camera body 2.

Several camera components are arranged above the photographic lens 3 in the front portion of the camera body 2. In particular, camera components including a paired light projecting window 4a and light receiving window 4b comprising an autofocus (AF) rangefinder unit which performs automatic focusing, a light receiving window 5 of an autoexposure (AE) unit which performs automatic exposure control, and a viewfinder window 6 of a viewfinder optical system are arranged above the photographic lens 3. Further, a release button 7, which is actuated by compression, projects from the top of the camera body 2 and is arranged on the left-hand side of the camera body 2 as seen from the front.

A strobe light generating unit 10 is arranged in a front portion of the camera body 2 opposite the release button 7, specifically, in a front upper right-hand side portion of the camera 1, as seen from the front. Strobe light from the strobe light generating unit 10 illuminates forward of the camera 1.

As shown in FIGS. 1 and 2, the strobe light generating unit 10 comprises a strobe light reflector 11, a xenon tube 12 positioned in the inside of the strobe light reflector 11, and a Fresnel lens 13, which is a transparent panel positioned at the front side of the strobe light reflector 11.

Further, as shown in FIGS. 1–3, the camera body 2 includes a camera body cover 14, and an aperture 14a (FIG. 3) in the camera body cover 14 which is opened in a portion of the front surface of the camera 1. The Fresnel lens 13 fits into the aperture 14a such that a flash generated by the strobe light generating unit 10 is seen through the Fresnel lens 13. Furthermore, as shown in FIGS. 1 and 2, a mounting plate 15 is disposed in the camera body 2 for mounting the strobe light generating unit 10.

As shown in FIG. 1, a strobe light generating circuit 16 is disposed at the back surface side of the strobe light generating unit 10. An electric power supply battery 17 is positioned below the strobe light generating circuit 16 to drive electrical system components arranged in the camera 1, including the strobe light generating unit 10. A strobe capacitor 18 disposed forward of the power supply battery 17 and below the strobe light generating unit 10 performs charging for strobe light generation.

Various other functional components are incorporated in the camera 1. For example, a film cartridge compartment, a film spool compartment for winding up the film, and other functional components are arranged in suitable positions. Details of these components are well known and specific description and illustration are omitted.

A red-eye reduction light generating unit including a red-eye reduction lamp 20 is disposed adjacent to the strobe reflector 11 at the lower side of the strobe reflector 11. The red-eye reduction lamp 20 is a light generating member provided to reduce the red-eye phenomenon during flash photography. The red-eye reduction light generating unit includes a red-eye reduction lamp reflector 21 which supports the red-eye reduction lamp 20 and regulates the direction in which the red-eye reduction lamp 20 shines. The red-eye reduction lamp reflector 21 is also disposed adjacent to the lower side of the strobe reflector 11.

A holder 22 holds the red-eye reduction lamp 20 to maintain the red-eye reduction lamp 20 at a fixed position in the camera body 2. The holder 22 abuts against a cover member 23 which fixes the strobe reflector 11 in the strobe light generating unit 10. Further, a protective member 24 is disposed between the back surface of the cover member 23 and the strobe light generating circuit 16 to prevent noise from affecting other camera components.

In accordance with embodiments of the present invention, a cut-away portion 11a is formed in the lower side of the strobe reflector and a portion of the red-eye reduction lamp reflector 21 is located to border on the cut away portion 11a. The cut away portion 11a has a size and is arranged at a location which does not affect the strobe light in the strobe reflector 11. By positioning the red-eye reduction lamp reflector 21 to border on the cut away portion 11a, when locating the red-eye reduction lamp 20 adjacent to the strobe light generating unit 10, the height dimension of the camera body 2 can be reduced because the space in the camera body is used more effectively.

As shown in FIGS. 1 and 2, the strobe capacitor 18 is disposed below, and is vertically aligned with, the strobe light generating unit 10 in the camera body 2. The red-eye reduction lamp 20 is interposed between the strobe capacitor and the strobe light generating unit 10.

In accordance with embodiments of the present invention, the red-eye reduction light generating unit including red-eye reduction lamp 20 is arranged at the top end of the strobe capacitor 18, between a pair of terminals 18a and 18b which project for connection with the xenon tube 12. As shown in FIG. 2, a pair of holes 23a and 23b is formed in the cover member 23 and the terminals 18a and 18b, respectively, of the strobe capacitor 18 are inserted through these holes.

In accordance with the above-described structure, the red-eye reduction lamp reflector 21, which supports the red-eye reduction lamp 20, can be positioned as close as possible to the strobe capacitor 18. As a result, the camera 1 can be made compact because the height dimension is reduced by minimizing the space needed in the camera body 2 for the terminals 18a and 18b.

Thus, in accordance with the above-described embodiments of the present invention, the red-eye reduction lamp 20 is located directly below the strobe light generating unit 10, and borders on the strobe light generating unit 10. The strobe capacitor 18 is located further below the strobe light generating unit 10, with the red-eye reduction lamp between the strobe capacitor 18 and the strobe light generating unit 10. Further, approximately the upper half of the red-eye reduction lamp 20 borders on the cut away portion 11a formed in the strobe reflector 11 in the strobe light generating unit 10, and approximately the lower half of the red-eye reduction lamp 20 is between the terminals 18a, 18b projecting in the upper end of the strobe capacitor 18. By arranging the strobe light generating unit 10, the red-eye reduction lamp 20, and furthermore the strobe capacitor 18 in the above-described manner, the camera components can be incorporated in a space having a height dimension (vertical direction) which is as small as possible.

In accordance with the above-described structure, the cut away portion 11a formed in the strobe reflector 11, and the clearance space between the terminals 18a, 18b of the strobe capacitor 18 are advantageously used to position the red-eye reduction lamp 20, resulting in compactness of the camera. Thus, it is possible to insert the red-eye reduction lamp 20 between the strobe light generating unit 10 and the strobe capacitor 18, even when a space is not specifically provided between the strobe light generating unit 10 and the strobe capacitor 18 for the red-eye reduction lamp 20.

Furthermore, in accordance with embodiments of the present invention, a portion of the Fresnel lens 13 covers the front surface of the strobe light generating unit 10. The red-eye reduction lamp 20 is adjacent to the strobe light generating unit 10, and the Fresnel lens 13 also extends to cover the front surface of the red-eye reduction lamp 20. Accordingly, it is not necessary to arrange a window portion specifically for the red-eye reduction lamp 20. Further, since the Fresnel lens 13 is one member, the number of camera components is reduced, and the design cost is lowered.

Furthermore, by covering strobe light generating unit 10 and the front surface of the red-eye reduction lamp 20 with the same Fresnel lens 13, a good external appearance of the camera is obtained because the strobe light generating unit 10 and the red-eye reduction lamp 20 are difficult to see from outside the camera.

However, the form of the peripheral portion of the Fresnel lens 13, specifically, the portion covering the red-eye reduction lamp 20, is not limited to the type described above. For example, the Fresnel lens 13 may have an effective outlet form for the emission of the red-eye reduction lamp 20. Further, a Fresnel lens portion may be specially disposed to exclusively cover the front surface of the red-eye reduction lamp 20.

The present invention is not limited to the embodiments described above, and suitable modifications and changes can be made to the form, structure, etc., of the built-in strobe type camera 1.

For example, in the embodiments described above, the red-eye reduction lamp 20 has been described as located directly below the strobe light generating unit 10, and the strobe capacitor 18 has been described as located below the red-eye reduction lamp 20. However, the present invention is not limited to the above-described arrangement, and by locating the strobe capacitor 18 and the red-eye reduction lamp 20 as close together as possible, the insertion space is made the minimum possible.

In accordance with embodiments of the present invention, a Fresnel lens 13 was described as the transparent panel covering a front surface of the strobe light generating unit 10 and the red-eye reduction lamp 20. However, any kind of transparent panel plate having a lens function, such as a simple glass material or synthetic resin material, may be used as a protective transparent panel.

Further, embodiments of the present invention have been described with respect to a lens shutter type of compact camera having a strobe which is a built-in strobe. However, the present invention is not limited to a lens shutter type of camera, and may also be applied to other types of cameras whose structure is well known in the art, such as single lens reflex cameras and the like. Furthermore, the strobe is not limited to one which is built into the camera 1, and the present invention is applicable to a camera having a detachable strobe device.

Moreover, embodiments of the present invention have been described as using a red-eye reduction lamp 20 as the light generating member for red-eye reduction. The present invention is not limited to the lamp 20. For example, any suitable light emitting member may be used.

In accordance with embodiments of the built-in strobe type of camera according to the present invention, because at least a portion of the light generating member which functions as a red-eye reduction lamp is located facing between the pair of terminals projecting from the strobe capacitor, the camera is made more compact with a simple structure.

In accordance with embodiments of the present invention, because the space between the terminals of the strobe capacitor is utilized for the red-eye reduction lamp, the height dimension of the camera is correspondingly shortened, and can be kept to a minimum. Accordingly, it is possible to curtail the space needed to incorporate a red-eye reduction lamp within the camera body, and the design of the camera as a whole can be made compact. Furthermore, because no special structural components are necessary to incorporate the red-eye reduction lamp into the camera, the camera is easily assembled, and a reduction in cost can be provided.

Moreover, in accordance with embodiments of the present invention, because at least a portion of the red-eye reduction lamp is located between the strobe light generating unit and the pair of terminals projecting from the strobe capacitor, in the built-in strobe type of camera, the red-eye reduction lamp can be located as close as possible to the strobe capacitor, the height dimension in the camera can be kept to a minimum, and overall compactness of the camera can be attained.

In accordance with embodiments of the present invention, since the front surface of the red-eye reduction lamp is adjacent to the strobe light generating unit, both the front surfaces of the red-eye reduction lamp and the strobe light generating unit can be covered by a single transparent panel of a Fresnel lens or the like. Accordingly, a reduction in the number of components and a reduction in cost can be provided. Furthermore, a good external appearance of the camera can be obtained.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A camera, comprising:
   a strobe capacitor having a pair of projecting terminals; and
   a light generating member having at least a portion located between the pair of projecting terminals at a height in the camera which overlaps with a height of the pair of projecting terminals.

2. A camera as recited in claim 1, wherein the light generating member is a red-eye reduction lamp.

3. A camera as recited in claim 1, further comprising a strobe light generating unit adjacent to the light generating member.

4. A camera as recited in claim 3, wherein the strobe capacitor, the light generating member and the strobe light generating unit are arranged vertically in the camera with the light generating member positioned between the strobe light generating unit and the strobe capacitor.

5. A camera as recited in claim 4, wherein the strobe light generating unit comprises a strobe reflector having a cut-away portion on a lower side,
   wherein at least a portion of the light generating member is positioned bordering on the cut-away portion.

6. A camera as recited in claim 5, wherein approximately a lower half of the light generating member is positioned between the pair of terminals, and approximately an upper half of the light generating member borders on the cut-away portion.

7. A camera, comprising:
   a strobe light generating unit;
   a strobe capacitor having a pair of terminals projecting from an end surface of the strobe capacitor; and
   a light generating member located between the strobe light generating unit and the strobe capacitor,
   wherein at least a portion of the light generating member is located between the pair of terminals projecting from the strobe capacitor at a height in the camera which overlaps with a height of the pair of projecting terminals.

8. A camera as recited in claim 7, wherein the strobe light generating unit comprises a strobe reflector having a cut-away portion in a lower side of the strobe reflector, and at least a portion of the light generating member borders on the cut-away portion.

9. A camera as recited in claim 8, wherein the light generating member comprises a light reflector and the light reflector borders on the cut-away portion.

10. A camera as recited in claim 7, further comprising:
    a transparent panel located in an aperture in the camera body to cover a front surface of the strobe light generating unit and a front surface of the light generating member.

11. A camera as recited in claim 10, wherein the transparent panel is a Fresnel lens.

12. A camera as recited in claim 8, wherein the strobe light generating unit further comprises a cover member to which the strobe reflector is attached, the cover member having a pair of holes formed therein through which the pair of terminals are inserted.

13. A camera as recited in claim 7, wherein the light generating member is a red-eye reduction lamp.

14. A camera as recited in claim 8, wherein approximately a lower half of the light generating member is positioned between the pair of terminals, and approximately an upper half of the light generating member borders on the cut-away portion.

15. A camera, comprising:
    a strobe capacitor having a pair of projecting terminals; and
    a light generating member having at least a portion located between the pair of projecting terminals, wherein the light generating member is positioned such that a line connecting the pair of projecting terminals intersects the light generating member.

16. A camera as recited in claim 15, wherein the light generating member is a red-eye reduction lamp.

17. A camera as recited in claim 15, further comprising a strobe light generating unit adjacent to the light generating member.

18. A camera as recited in claim 17, wherein the strobe capacitor, the light generating member and the strobe light generating unit are arranged vertically in the camera with the light generating member positioned between the strobe light generating unit and the strobe capacitor.

19. A camera as recited in claim 18, wherein the strobe light generating unit comprises a strobe reflector having a cut-away portion on a lower side,
    wherein at least a portion of the light generating member is positioned bordering on the cut-away portion.

20. A camera as recited in claim 19, wherein approximately a lower half of the light generating member is positioned between the pair of terminals, and approximately an upper half of the light generating member borders on the cut-away portion.

21. A camera, comprising:
    a strobe light generating unit;
    a strobe capacitor having a pair of terminals projecting from an end surface of the strobe capacitor; and
    a light generating member located between the strobe light generating unit and the strobe capacitor,
    wherein at least a portion of the light generating member is located between the pair of terminals projecting from the strobe capacitor and is positioned such that a line connecting the pair of terminals intersects the light generating member.

22. A camera as recited in claim 21, wherein the strobe light generating unit comprises a strobe reflector having a cut-away portion in a lower side of the strobe reflector, and at least a portion of the light generating member borders on the cut-away portion.

23. A camera as recited in claim 22, wherein the light generating member comprises a light reflector and the light reflector borders on the cut-away portion.

24. A camera as recited in claim 21, further comprising:
    a transparent panel located in an aperture in the camera body to cover a front surface of the strobe light generating unit and a front surface of the light generating member.

25. A camera as recited in claim 24, wherein the transparent panel is a Fresnel lens.

26. A camera as recited in claim 22, wherein the strobe light generating unit further comprises a cover member to which the strobe reflector is attached, the cover member having a pair of holes formed therein through which the pair of terminals are inserted.

27. A camera as recited in claim 21, wherein the light generating member is a red-eye reduction lamp.

28. A camera as recited in claim 22, wherein approximately a lower half of the light generating member is positioned between the pair of terminals, and approximately an upper half of the light generating member borders on the cut-away portion.

29. A camera, comprising:

a strobe capacitor having a pair of projecting terminals; and a light generating member having at least a portion located between the pair of projecting terminal, the portion being sandwiched between the pair of projecting terminals.

* * * * *